United States Patent [19]
Hait

[11] Patent Number: 5,218,950
[45] Date of Patent: Jun. 15, 1993

[54] OUTDOOR PEDESTAL STAND COOKING UNIT WITH FOLDABLE COMPONENTS

[75] Inventor: Paul W. Hait, Sunriver, Oreg.

[73] Assignee: Pyromid, Inc., Redmond, Oreg.

[21] Appl. No.: 802,813

[22] Filed: Dec. 6, 1991

Related U.S. Application Data

[63] Continuation-in-part of Ser. No. 589,382, Sep. 28, 1990, Pat. No. 5,086,752.

[51] Int. Cl.⁵ .............................................. F24C 1/16
[52] U.S. Cl. .................................. 126/9 R; 126/9 B; 126/25 R; 126/26
[58] Field of Search ................. 126/9 R, 25 R, 29, 26, 126/9 B

[56]         References Cited
         U.S. PATENT DOCUMENTS

3,719,181  3/1973  Porter, Jr. ............................. 126/30
5,086,752  2/1992  Hait ...................................... 126/9 R

Primary Examiner—Larry Jones
Attorney, Agent, or Firm—Jack M. Wiseman

[57]          ABSTRACT

An outdoor cooking unit in which a foldable pedestal stand supports above the ground a foldable firebox with an inverted, truncated pyramidal configuration. Disposed within the firebox is a fire grate. A cooking grill is disposed above the fire grate. The foldable pedestal stand includes a foldable pillar having an inverted, truncated pyramidal configuration. The firebox is supported by the pillar of the pedestal stand. The pedestal stand also includes a foldable base which supports the foldable pillar. The pillar is detachably secured to the base. A cover plate and a clamping plate are secured to panels of the firebox along the quadrilateral lower perimeter thereof to rigidify the firebox while in the extended state.

23 Claims, 9 Drawing Sheets

OUTDOOR PEDESTAL STAND COOKING UNIT WITH FOLDABLE COMPONENTS

RELATED APPLICATION

This application is a continuation-in-part of my co-pending application, Ser. No. 07/589,382, filed on Sep. 28, 1990, for Outdoor Cooking Unit With A Pedestal Stand, now U.S. Pat. No. 5,086,752, issued Feb. 11, 1992.

BACKGROUND OF THE INVENTION

The present invention relates in general to outdoor cooking units, and more particularly to an outdoor cooking unit with an upright support stand.

Heretofore, portable outdoor cooking units were supported by carts, tables, tripod arrangements and legs. Such portable outdoor cooking units that did not employ truncated pyramidal fireboxes and cooking chambers are considered to be fuel inefficient, difficult to clean, and difficult for the igniting of briquettes, requiring relatively long time spans for cooling and are cumbersome for relocating and storing.

The Weber Covered Barbeque Kettle has been sold by Weber-Stephen Products Co., which includes a bowl-shaped firebox supported by a tripod-leg arrangement. Positioned within the firebox is a fuel grate on which is disposed briquettes. Positioned within the firebox above the fuel grate is a cooking grill on which food is disposed for cooking. Several legs of the tripod-leg arrangement are supported by wheels and the remaining leg of the tripod-leg arrangement has a rubber or plastic foot. Attached to the bowl are wooden handles. By gripping a handle and tilting the cooking unit, the leg having a rubber foot is lifted from the supporting surface and the cooking unit is movably supported by the wheels At the bottom of the firebox are dampers for controlling combustion air input to the firebox. Below the dampers at the bottom of the firebox is a pan for catching ashes fallen from the firebox. A bowl-shaped cover is adapted to seat on the bowl-shaped firebox to provide an enclosed cooking chamber. A wooden handle is attached to the cover to enable an operator to remove the cover or seat the cover on the firebox. Dampers are formed in the cover for controlling the venting of air from the cooking chamber into the atmosphere and also controlling the input of combustion air into the firebox.

Outdoor cooking units, particularly outdoor cooking units in which gas is used to ignite the briquettes, are supported by legs and have tables or trays extending from the firebox.

The Hait U.S. Pat. No. 4,624,238, issued on Nov. 25, 1986, for Device Interchangeable As An Outdoor Stove And A Table, discloses a stand for supporting a cooking unit above the ground. The stand is in the nature of a table with detachable legs. The cooking unit comprises a truncated pyramidal support member telescopically receiving an inverted truncated pyramidal firebox. The Hait U.S. Pat. No. 4,624,238, also discloses a hood to form a cooking chamber. A handle extends from the hood and the hood has a hinged top panel.

The Hait U.S. Pat. No. 4,884,551, issued on Dec. 5, 1989, for Outdoor Cooking Unit, discloses a bowl-shaped cooking unit supported by legs above the ground. A removable firebox is suspended within the bowl-shaped vessel. Seated on the firebox is a cooking grill and disposed in the firebox below the cooking grill is a fire grate.

In the Chambers et al. U.S. Pat. No. 1,403,842, issued on Jan. 17, 1922, for Camp Stove, there is disclosed a foldable camp stove supported by hinged legs. The Sivey U.S. Pat. No. 2,119,799, issued on Jun. 7, 1938, for Collapsible Stove discloses a foldable stove supported by angle iron legs.

The Owens U.S. Pat. No. 2,237,081, issued on Apr. 1, 1941, for Cooker And Heater, discloses an outdoor cooking unit supportable close to the ground by feet or elevated above the ground by a foldable rack. The Leslie U.S. Pat. No. 3,327,698, issued on Jun. 27, 1967, for Camp Cook Stove discloses a table with foldable legs for supporting burners for cooking.

In the Richins U.S. Pat. No. 3,489,131, issued on Jan. 13, 1970, for Collapsible Camp Stove, there is disclosed a firebox supported by a plurality of legs. The Giroux U.S. Pat. No. 3,809,051, issued on May 7, 1974, for Portable Barbeque Oven discloses a table for supporting a cooking unit with a firebox. The table is supported by foldable legs.

In the Hait et al. U.S. Pat. No. 4,531,505, issued on Jul. 30, 1985, for Convertible Cooking Unit With An Oven, there is disclosed a cooking unit with a truncated, pyramidal firebox with a hinged access door. An oven is disposed above the firebox. The Hait U.S. Pat. No. 4,938,202, issued on Jul. 3, 1990, for Outdoor Cooking Unit With Disposable Component, discloses an outdoor cooking unit in which an inverted, truncated pyramidal firebox is supported in nested relation on a truncated pyramidal support. The adjoining panels of the truncated pyramidal firebox and the truncated pyramidal support are hinged together so as to be foldable units. A bendable, disposable and non-combustible liner is disposed along the inner surfaces of the firebox and contoured to conform to the configuration of the interior of the firebox.

In the Hait U.S. Pat. No. 4,489,706, issued on Dec. 25, 1984, for Multi-Purpose Fuel Efficient Portable Stove/Heater, there is disclosed a truncated, pyramidal firebox formed with panels having trapezoidal configurations and supported by a stand. Tray-like panels extend from the top of the firebox. The tray-like panels are hinged to the cooking unit. The cooking chamber thereof includes a support frame at the top thereof.

The Noonan U.S. Pat. No. 522,483, issued on Jul. 3, 1894, for Tent And Support, discloses a stove having a conical configuration. An annular flange supports the stove above the ground. The Alsobrook U.S. Pat. No. 1,285,193, issued on Aug. 13, 1918, for Water Heater discloses a conical stove supported by legs above the ground. The British patent to Hateley, No. 1372, issued on Jan. 28, 1916, for a Fire Bucket Or Stove discloses a firebox for a cooking unit which is supported above the ground by angularly disposed legs. Pyromid, Inc. of Redmond, Ore., has manufactured and sold a portable cooking unit supported by angularly disposed legs.

In the Latouf U.S. Pat. No. 4,149,514, issued on Apr. 17, 1979, for Barbeque Burner, there is disclosed a foldable barbeque burner with an upright container. The upright panels of the container are hinged together and have trapezoidal configurations.

SUMMARY OF THE INVENTION

An outdoor cooking unit in which a pedestal stand supports above a supporting surface a firebox. Disposed within the firebox is a fire grate. A cooking grill is disposed above the fire grate. Adjoining panels of the pedestal stand are hinged together so as to be foldable for transporting and for storing the outdoor cooking unit.

An outdoor cooking unit in which a pedestal stand supports above a supporting surface a firebox with an inverted, truncated pyramidal configuration. Disposed within the firebox is a fire grate. A cooking grill is positioned above the fire grate. The pedestal stand includes a pillar having an inverted, truncated pyramidal configuration. The firebox is supported by the pillar of the pedestal stand. Adjoining panels of the pedestal stand and also adjoining panels of the firebox are hinged together along the sides thereof so as to be foldable for transporting and for storing the outdoor cooking unit.

An object of the present invention is to provide an outdoor cooking unit in which an upstanding and elongated pedestal stand for supporting a firebox is foldable and removable for transporting and for storing the outdoor cooking unit.

Another object of the present invention is to provide an outdoor cooking unit with a firebox supported above a supporting surface at a convenient height for the operator by an elongate, upstanding pedestal stand in which the components thereof are foldable, separable and removable to facilitate the disassembly of the outdoor cooking unit for transporting and storing the outdoor cooking unit.

Another object of the present invention is to provide a cooking unit supported above a supporting surface at a convenient height to the operator with foldable components for transporting and storing the cooking unit.

Another feature of the present invention is the detachably securing of the elongated upstanding hollow pillar and the base of the pedestal stand to disassemble the outdoor cooking unit for transporting and for storage.

Another feature of the present invention is an arrangement for rigidifying the foldable components of the outdoor cooking unit while in the extended state.

DESCRIPTION OF THE PREFERRED EMBODIMENTS

Illustrated in FIGS. 1-4 is an outdoor cooking unit 10 embodying the present invention, which comprises a pedestal stand 15 for placement on a suitable support surface, such as a patio or the ground. In the exemplary embodiment, the pedestal stand 15 is made of suitable material, such as steel. The pedestal stand 15 includes a hollow base 16 that is adaptable for placement on a patio, the ground or any other suitable support surface. In the preferred embodiment, the pedestal base 16 has a truncated pyramidal configuration. Adjoining panels 16a-16d of the pedestal base 16 are hinged together along the sides thereof by suitable hinges 16e-16h. The hinges 16e-16h, in the exemplary embodiment, are of the type described in detail in the Hait U.S. Pat. No. 4,508,094, for Convertible Cooking Unit. More specifically, adjoining sides of the panels 16a-16d are hinged together by elongate hinges 16e-16h, respectively, each of which include a plurality of short aligned hinge joints. The pedestal stand 15 also includes a hollow pillar or a hollow, upstanding support 17, which has an inverted, truncated pyramidal configuration. The side panels 16a-16d of the base 16 and side panels 17a-17d of the pillar 17 have trapezoidal configurations. Adjoining panels 17a-17d of the piller 17 are hinged together along the sides thereof by suitable hinges 17e-17h. The hinges 17e-17h, in the exemplary embodiment, are of the type described in detail in the Hait U.S. Pat. No. 4,508,094 for Convertible Cooking Unit. More specifically, adjoining sides of the panels 17a-17d are hinged together by elongate hinges 17e-17h, respectively, each of which include a plurality of short aligned hinge joints.

A cover plate 18 seats on an upper quadrilateral perimeter 19 (FIGS. 3 and 4) of the base 16. The cover plate 18 has a center opening and depending angular sides 18a that extend downwardly and outwardly to overlap the quadrilateral perimeter 19 of the base 16. Seated on the cover plate 18 is a lower quadrilateral perimeter 20 of the pillar 17. At the lower quadrilateral perimeter 20 of the pillar 17 are inwardly, upwardly directed, marginal arcuate channel flanges 20a and a center opening. Seated within the channel flanges 20a of the pillar 17 is an upper clamping plate 21 with a center opening and a generally quadrilateral perimeter. The quadrilateral perimeter of the upper clamping plate 21 has depending flanges 21a that seat respectively within the channel flanges 20a of the pillar 17. A lower clamping plate 23 has a generally quadrilateral perimeter with upwardly directed flanges 23a that engage respectively downwardly turned flanges 16i of the base 16. The lower clamping plate 23 is formed with a center opening. A thumb bolt 24 is received by the center openings of the upper clamping plate 21, the cover plate 18 and the lower clamping plate 23. A wing nut 26 is threaded to the bolt 24 to detachably secure the pillar 17 to the base 16. The securing of the foldable pillar 17 to the foldable base 16 through the upper clamping plate 21, the cover plate 18 and the lower clamping plate 23 rigidify the pillar 17 and the base 16 of the pedestal stand 15 during the extended state.

Formed on the pillar 17 are suitable air vents 25 for supplying combustion air to a hollow foldable firebox 30 of the cooking unit 10. In the exemplary embodiment, the firebox 30 is made of stainless steel. In the preferred embodiment, the firebox 30 has an inverted, truncated pyramidal configuration. The firebox 30 is dimensioned and configured at its upper quadrilateral perimeter 31 to abut against the inner walls of the pillar 17 and is suspended therefrom into the pillar 17. The panels 30a-30d of the firebox 30 have trapezoidal configurations in the preferred embodiment. Formed in the lower section of the firebox 30 are suitable air vents 32 that communicate with the air vents 25 of the pillar 17 for supplying combustion air within the firebox 30.

Adjoining panels 30a-30d of the firebox 30 are hinged together along the sides thereof by suitable hinges 30e-30h. The hinges 30e-30h, in the exemplary embodiment, are of the type described in detail in the Hait U.S. Pat. No. 4,508,094, for Convertible Cooking Unit. More specifically, adjoining sides of the panels 30a-30d are hinged together by elongate hinges 30e-30h, respectively, each of which includes a plurality of short aligned hinge joints. The firebox 30 is foldable to facilitate the transporting and storage of the outdoor cooking unit 10.

A cover plate 33 is disposed below the panels 30a-30d of the firebox 30 and has a center opening. The cover plate 33 is formed with upwardly extending, outwardly directed sides 33a that engage and embrace the lower edges of the panels 30a-30d of the firebox 30 exteriorly. The panels 30a-30d of the firebox 30 are formed with upright interior flanges 33b (FIG. 4), respectively, that are spaced inwardly to form channels or grooves. Disposed above the cover plate 33 within the firebox 30 is a clamping plate 34. The clamping plate 34 has a generally quadrilateral perimeter with depending flanges 34a which are respectively disposed outwardly of the upright flanges 33a of the panels 30a-30d and in engagement with the panels 30a-30d, respectively, of the firebox 30. The flanges 33a, respectively, seat within the channels or grooves formed at the quadrilateral lower perimeter of the panels 30a-30d. The clamping plate 34 is formed with a center opening. A thumb bolt 36 is received by the center opening of the clamp plate 34 and a center opening of the cover plate 33. A wing nut 37 or a threaded sleeve welded to the cover plate 34 is threaded to the thumb bolt 36 to rigidify the firebox 30 while in the extended state.

In the preferred embodiment, a metal paper foil liner 35, such as an aluminum foil liner, is disposed within the firebox 30. The foil liner 35 has an inverted, truncated pyramidal configuration with trapezoidal panels. The foil liner 35 is a bendable, disposable and non-combustible liner that is disposed along the inner walls of the firebox 30. The inner sufaces of the foil liner 35 are reflective surfaces. The shape of the foil liner 35 conforms to the configuration of the inner walls of the firebox 30. In the exemplary embodiment, the foil liner 35 is a metallic paper made of tempered aluminum foil having a thickness within the gauge range of 0.001 inches to 0.005 inches. The tempering is the range of 50% to 100%. The foil liner 35 is disposable and is readily flexible to conform to the configuration of the inner surfaces of the firebox 30. Other metallic paper foils may be suitable, such as copper foil and stainless steel foil. Air vents 40 are formed in a bottom wall of the foil 35 in communication with the air vents 32 of the firebox 30 and the air vents 25 of the pillar 17 to provide combustion air within the foil liner 35. The number and size of open air vents 40 will exercise control over the rate of combustion of the fuel.

Optionally disposed within the hollow foil liner 35 is a suitable quadrilateral low heat fire grate, not shown, on which is disposed suitable fuel, such as briquettes. Disposed within the hollow foil liner at a height above the height intended for the low heat fire grate, not shown, is a high heat fire grate 45a on which is disposed suitable fuel, such as briquettes. Dependent on the heating preference of an operator, either the low heat fire grate, not shown, or the high heat fire grate 45a is employed. It is to be understood that the low heat fire grate, not shown, and the high heat fire grate 45a are not disposed within the firebox 30 at the same time and are not used simultaneously during the use of the outdoor cooking unit 10 for the cooking of food. In the preferred embodiment, the grates are made of stainless steel. A suitable high heat fire grate is described in detail in the Hait U.S. Pat. No. 4,829,975, issued on May 16, 1989, for Cooking Unit With Improved Fire Grate. The briquettes are ignited, preferably below the fire grate, to produce heat for cooking food. In the exemplary embodiment, an Esbit tablet is ignited below the fire grate for igniting the briquettes. Above the fire grate, such as the fire grate 45, and disposed within the foil liner 35 is a suitable quadrilateral cooking grill 46 on which is disposed food to be cooked by the heat generated from the firebox 30 and the foil liner 35. In the preferred embodiment, the cooking grill 46 is made of perforated stainless steel. In the exemplary embodiment, the cooking grill 46 is disposed slightly below the upper quadrilateral perimeter 17i of the pillar 17. The cooking grill 46, in the preferred embodiment, is formed with downwardly directed sides 46a along the perimeter thereof for inhibiting food from falling off the grill 46. Optionally, a cooking grill of smaller dimension, but similarly configured, can be disposed within the firebox 35 at a lower height.

The cooking unit 10 of the present invention is fuel efficient. The pyramidal or truncated, pyramidal configuration of the firebox 30 and the truncated, pyramidal configuration of the foil liner 35 are able to reflect a concentrated and a converged source of radiant heat to direct or focus the concentrated and converged radiant heat onto the grill 46 along a conductive path to efficiently cook the food on the cooking grill 46. The stainless steel reflective walls and the metallic paper foil reflective walls efficiently direct the heat along the conductive paths and at the same time isolate the pillar 17 from the heat emanating from the fuel on the fire grate 45a. As a result thereof, the pillar 17 remains relatively cool. The pillar 17 remains relatively cool, additionally, from the dead air space between the inner walls of the pillar 17 and the outer walls of the firebox 30. The surface angles of the pyramidal or truncated pyramidal firebox 30 and the surface angles of the truncated pyramidal foil liner 35 direct and focus the radiant heat from the fuel on the fire grate 45a along a path to the cooking grill 46 to efficiently heat the cooking grill 46 and the food thereon.

The pillar 17 and the base 16 remain relatively cool for the safety of the operator. Additionally, the relative coolness of the piller 17 and the base 16 enables the pillar 17 and the base 16 to be painted with low heat paint to lower the cost of production.

In the preferred embodiment, a suitable foldable hollow hood or cover 50 (FIGS. 1-4) is removably seated along the upper perimeter of the cooking grill 46 and along the upper, quadrilateral perimeter 17i of the pillar 17. The base of the foldable hood 50 has a quadrilateral shape configured to conform to the shape of the upper perimeter 17i of the pillar 17 and the cooking grill 46. The hood 50, in the preferred embodiment, has a truncated pyramidal configuration and is made of stainless steel. In the exemplary embodiment, the hood 50 seats on the inner wall of the pillar 17 above and adjacent to the cooking grill 46 and in alignment with the firebox 30. The quadrilateral shape of the base of the hood 50 conforms to the contour of the quadrilateral configuration of the top of the firebox 30. At its bottom, the hood 50 is open and at the top the hood 50 is closed by a cover plate 51 to provide a cooking chamber for cooking the food on the cooking grill 46. The cooking unit 10 cools relatively fast by virtue of the reflection of heat by its reflective stainless components and also by virtue of the foil liner 35 capability of being removed from the firebox 30.

The hood or cover 50 can be formed with various height configurations depending on the food being cooked and also depending on the desired appearance. In the preferred embodiment, the hood 50 is formed with the cover plate 51 to form a suitable surface for heating a pot, a pan or other cooking utensil.

Side panels 50a-50d of the hood 50 have trapezoidal shapes. At least one handle 59 extends outwardly from a panel of the hood 50. In the preferred embodiment, the handle 59 is made of of a metal coil or may be made of suitable material that is a poor conductor of heat, such as wood, so as to be cool when gripped by an operator. Formed in the hood 50 are suitable air vents 57 for hot air to vent from the cooking chamber of the hood 50 into atmosphere. One panel 50a of the hood 50 provides a door 51a that is hinged at the lower edge thereof. The door 51a, when opened, provides access to the food cooking on the grill 46. Above the air vents 57 and on the panel 50c of the hood 50 in which the air vents 57 are formed is a pivotal flap 58 to optionally cover the air vents 57. The closing of the air vents 57 by the pivotal flap 58 interrupts the flow of air into the hood 50 for extinguishing the burning of the fuel, such as briquettes. Adjoining panels 50a-50d of the hood 50 are hinged together along the sides thereof by suitable hinges 50e-50h. The hinges 50e-50h, in the exemplary embodiment, are of the type described in detail in the Hait U.S. Pat. No. 4,508,094, for Convertible Cooking Unit. More specifically, adjoining sides of the panels 50a-50d are hinged together by elongate hinges 50e-50h, respectively, each of which includes a plurality of short aligned hinge joints. Thus, the hood 50 is foldable for transporting and storage.

The cover plate 51 has downwardly disposed outwardly directed flanges 51a to seat on an upper quadrilateral perimetric edge 52 of the panels 50a-50d exteriorly of the panels 50a-50d. Disposed within the hood 50 below the upper quadrilateral perimeter 52 is a clamping plate 53. The clamping plate 53 has upstanding walls or flanges 53a that engage the interior walls of the panels 50a-50d, respectively. The panels 50a-50d are formed with interior walls or flanges 50i that project downwardly from the hood 50 in spaced relation to form grooves along the upper quadrilateral perimeter edge of the panels 50a-50d, respectively. The flanges 53a of the clamping plate 53 are received by the grooves, respectively, of the panels 50a-50d for engaging the interior walls of the panels 50a-50d of the hood 50. The cover plate 51 has a center opening and the clamping plate 53 has a center opening. A thumb bolt 54 is received by the openings of the cover plate 51 and the clamping plate 53. A threaded nut 55 (FIG. 4) is threaded to the thumb bolt 54 to rigidify the cover plate 51 and the hood 50 in the extended state during cooking. The threaded nut 55 is disposed above the cover plate 51. The handles 59 are pivotally attached to the panels 50b and 50d of the hood 50.

Figure 1:
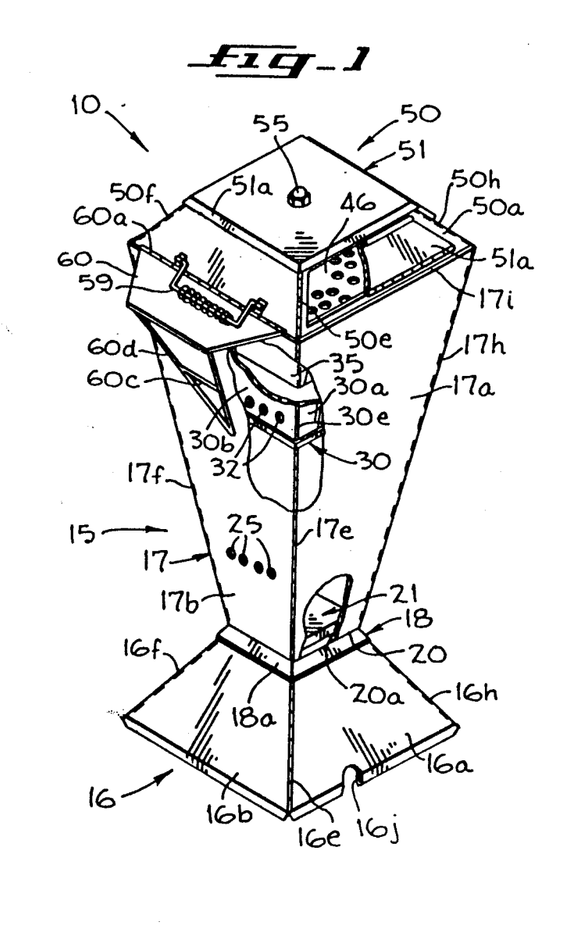
FIG. 1 is a front perspective view, partially broken away, of an outdoor cooking unit embodying the present invention with a foil liner lining the firebox.
Figure 2:
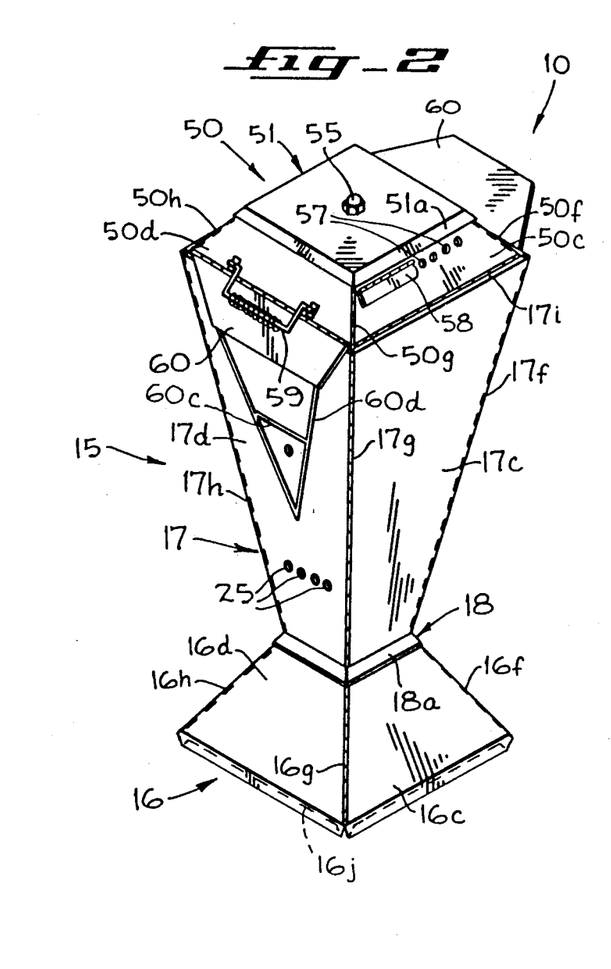
FIG. 2 is a rear perspective view of the outdoor cooking unit shown in FIG. 1.
Figures 3, 4:
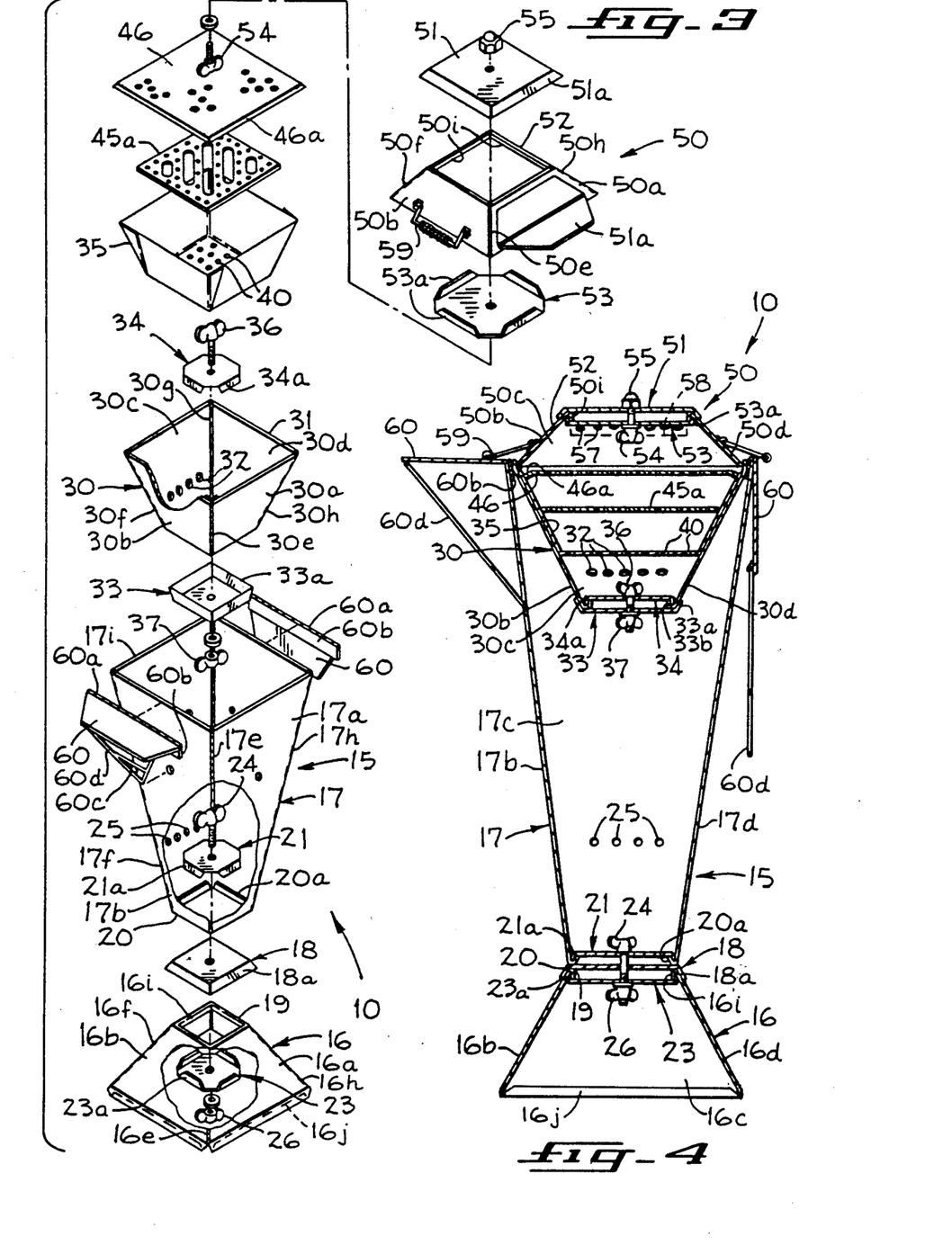
FIG. 3 is an exploded view of the outdoor cooking unit shown in FIGS. 1 and 2.
FIG. 4 a vertical sectional view, partially in elevation, of the outdoor cooking unit shown in FIGS. 1-3 taken along a vertical centerline.
Figure 5:
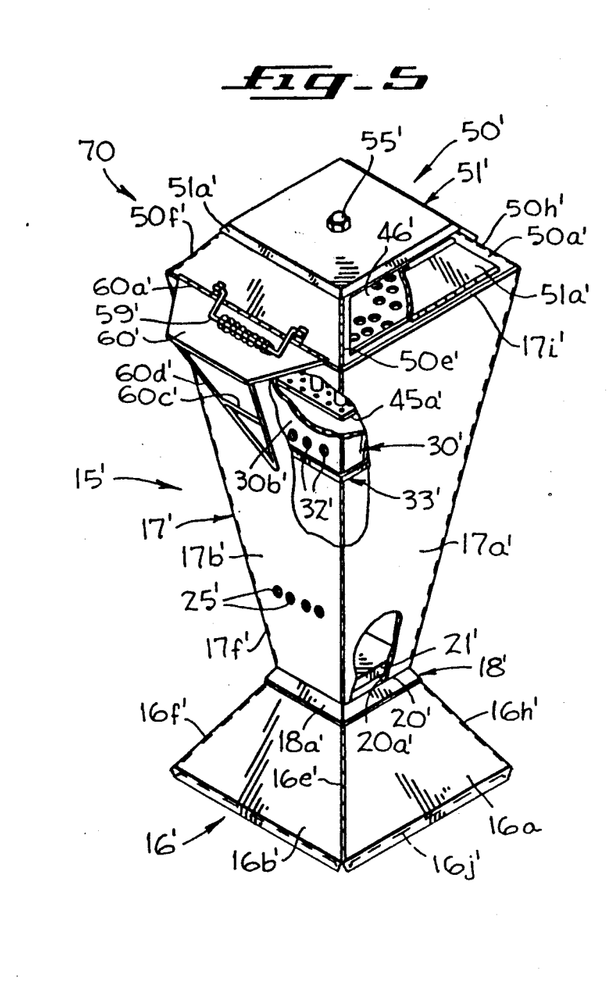
FIG. 5 is a front perspective view, partially broken away, of a modified outdoor cooking unit embodying the present invention without a foil liner lining the firebox.
Figure 6:
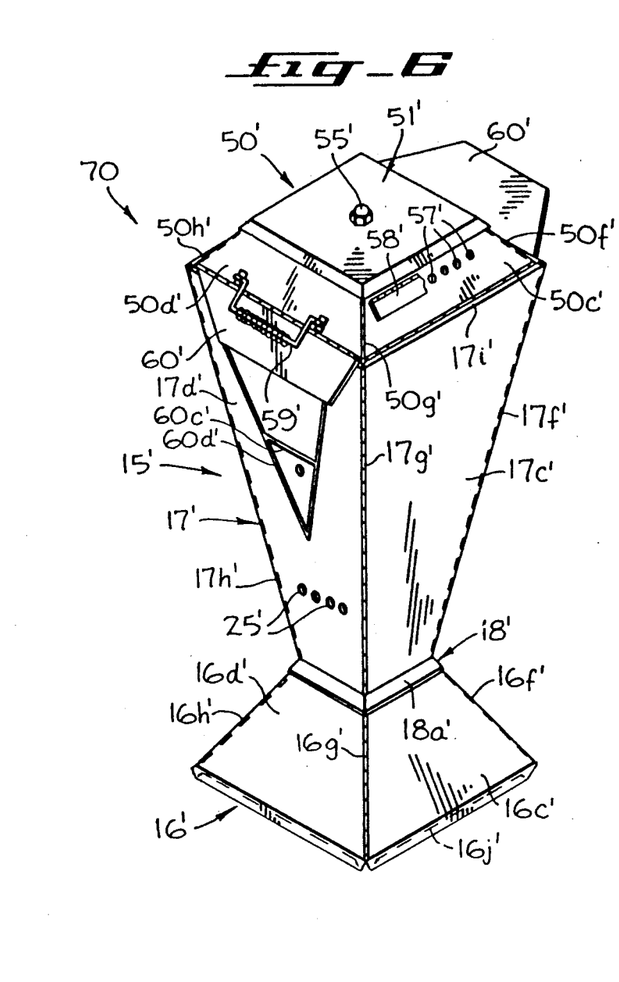
FIG. 6 is a rear perspective view of the outdoor cooking unit shown in FIG. 5.
Figures 7, 8:
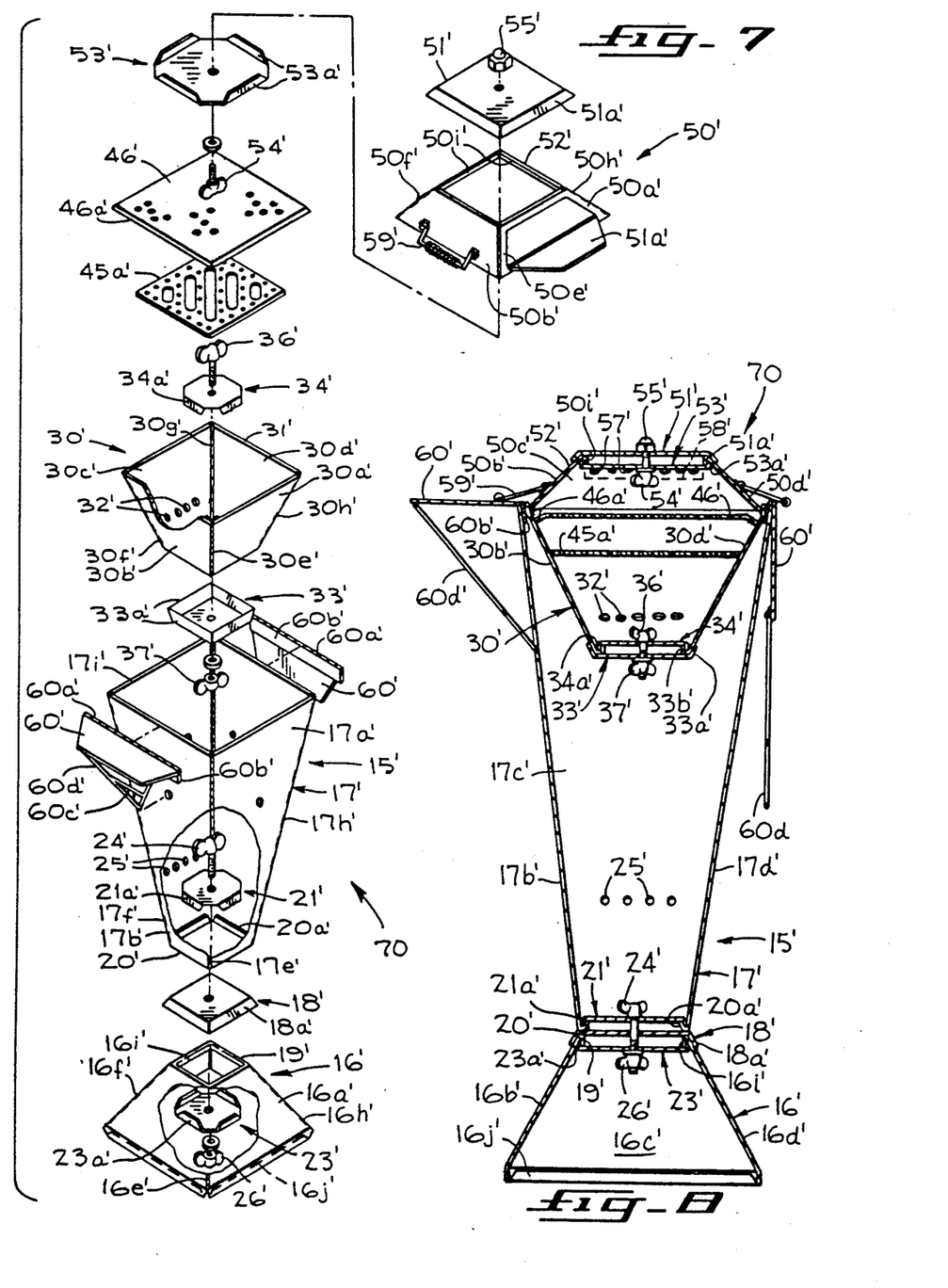
FIG. 7 is an exploded view of the outdoor cooking unit shown in FIGS. 5 and 6.
FIG. 8 is a vertical sectional view, partially in elevation, of the outdoor cooking unit shown in FIGS. 5-7 taken along a vertical centerline.

In the preferred embodiment, suitable trays or tables 60 extend outwardly from the top of the pillar 17. Each tray 60, in the exemplary embodiment, has a trapezoidal configuration and is made of suitable material, such as stainless steel. Each tray has a hinge 60a (FIG. 3) and a depending flange 60b along the widest edge of the parallel edges of the tray 60 to engage an outwardly projecting contiguous edge of the upper perimeter 17i of the pillar 17. The hinge 60a and the depending flange 60b are locked between the pillar 17 and the firebox 30 (FIG. 4). Thus, the tray 60 is movable between a horizontal position to be used as a convenient support surface and a depending position against a panel of the pillar 17 when the tray is not in use.

When the tray 60 is in the horizontal position, legs 60d and cross-piece 60c are pivotally connected to the underside of the tray 60. The legs 60d form a V-shape and are pivotally connected to the tray 60 at the outboard end thereof. The legs 60d extend in a diagonal converging direction downwardly from the tray 60 toward the panel of the pillar 17. The lower end of the legs 60d join to be received by an opening in the panel of the pillar 17 (FIGS. 3 and 4). The lower ends of the legs 60d engage the wall surrounding the opening formed in the panel of the pillar 17. When the tray 60 is in the depending position against the panel of the pillar 17, the lower ends of the legs 60d hang freely against the panel of the pillar 17. The legs 60d are moved until the tray 60 assumes a dependent position against the panel of the pillar 17. To move the tray 60 to a horizontal position, the tray 60 is raised by an operator to the horizontal position and the legs 60d enter the opening and engage the wall surrounding the hole for supporting the tray 60 in the horizontal position. While the exemplary embodiment of the present invention shows two trays 60 extending from the top of the pillar 17, it is apparent that the trays 60 can extend from one or more of the remaining panels of the pillar 17.

The truncated pyramidal hood 50 is disposed above the inverted, truncated firebox 30 and in alignment therewith to form a generally ten-sided figure. The firebox 30 is suspended within the pillar 17. The space between the pillar 17 and the firebox 30 provide a dead air zone which serves as heat insulation between the outer walls of the firebox 30 and the inner walls of the pillar 17.

It is contemplated that a suitable grate remover, not shown, may be provided for the lifting and removal of the fire grate and cooking grill. The grate remover, in the exemplary embodiment, is a U-shaped tong with angularly disposed free ends. The free ends of the U-shaped tong enter suitable openings in the fire grate and cooking grill to grip the grate or grill for lifting and removing the same.

At the bottom of the base 16, the base 16 is formed with an inturned flap 16j for reinforcing and rigidifying the lower perimeter of the base 16. The inturned flap 16j is folded over to reinforce and rigidify the lower perimeter of the base 16.

Illustrated in FIGS. 5-8 is an outdoor cooking unit 70, which is a modification of the outdoor cooking unit 10 shown in FIGS. 1-4. Components of the outdoor cooking unit 70 similar in structure and function to the components of the outdoor cooking unit 10 will have the same reference numeral but with a prime suffix.

The outdoor cooking unit 70 differs from the outdoor cooking unit 10 in that the foil liner 35 is not used. Hence, the fire grate, such as the fire grate 45a', will seat within the firebox 30' and engage the interior walls of the firebox 30' to be supported thereby. In a similar manner, the cooking grill 46' will seat on the upper quadrilateral perimeter 17a'of the pillar 17' or seat within the firebox 30' above the fire grate, such as the fire grate 45a', and engage the interior walls of the firebox 30' to be supported thereby. The manner of supporting the cooking grill 46' is dependent on its relative dimensions, which is determined by the food to be cooked by the cooking unit 70. In all respects, other than the use of the foil liner 35, the cooking units 10 and 70 are similar.

The truncated, pyramidal configuration of the firebox 30' reflects a concentrated and converged source of radiant heat to direct or focus the concentrated and converged radiant heat onto the grill 46' along a conductive path to efficiently cook the food on the cooking grill 46' in a fuel efficient manner. The stainless steel reflective walls efficiently direct the heat along the conductive paths and at the same time isolate the pillar 17' from the heat emanating from the fuel on the fire grate, such as the fire grate 45a'. As a result thereof, the pillar 17 remains relatively cool. The pillar 17' remains relatively cool, additionally, from the dead air space between the inner walls of the piller 17' and the outer walls of the firebox 30'. The surface angles of the pyramidal or truncated pyramidal firebox 30' direct and focus the radiant heat from the fuel on the fire grate, such as the fire grate 45a', along a path to the cooking grill 46' to efficiently heat the cooking grill 46' and the food thereon.

Figure 9:
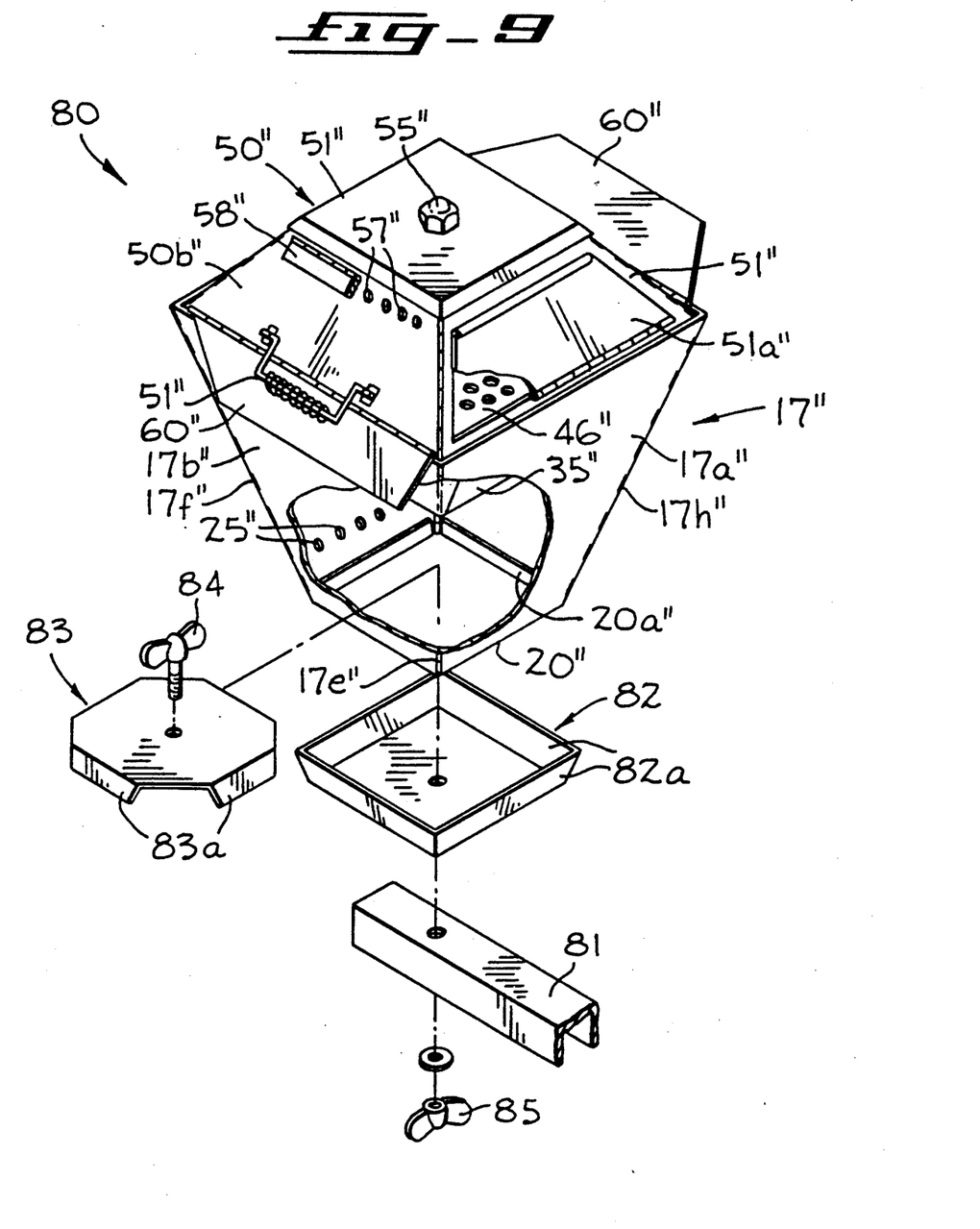
FIG. 9 is an exploded view, partially broken away, of a still further modified cooking unit embodying the present invention adapted to be supported by the railing of a boat, a fireplace, or any support on which a support arm can be detachably secured.
Figure 10:
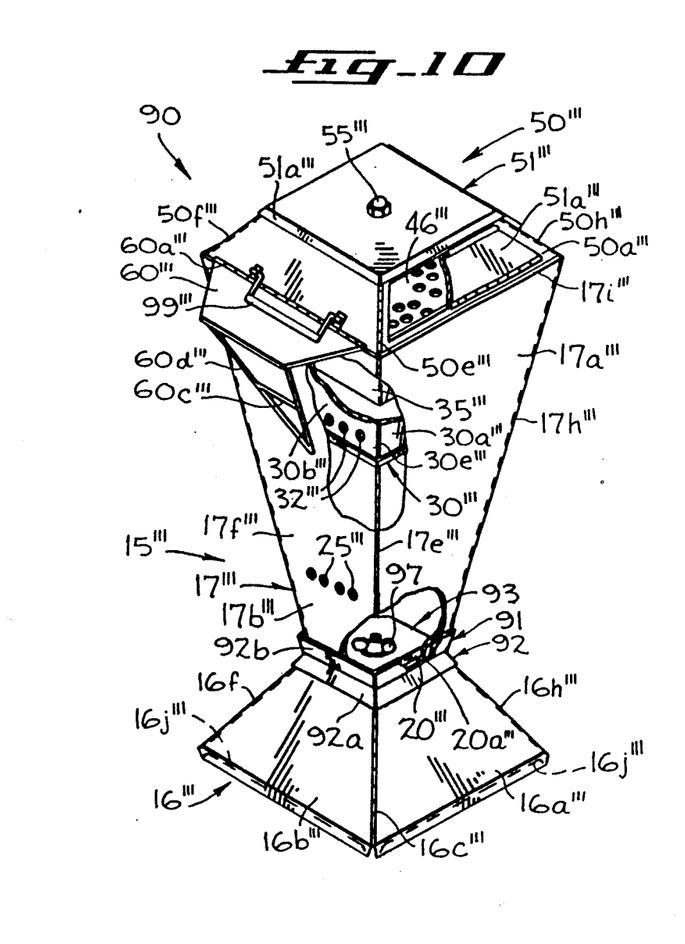
FIG. 10 is a front perspective view, partially broken away, of another modification of an outdoor cooking unit embodying the present invention with a foil liner lining the firebox.
Figure 11:
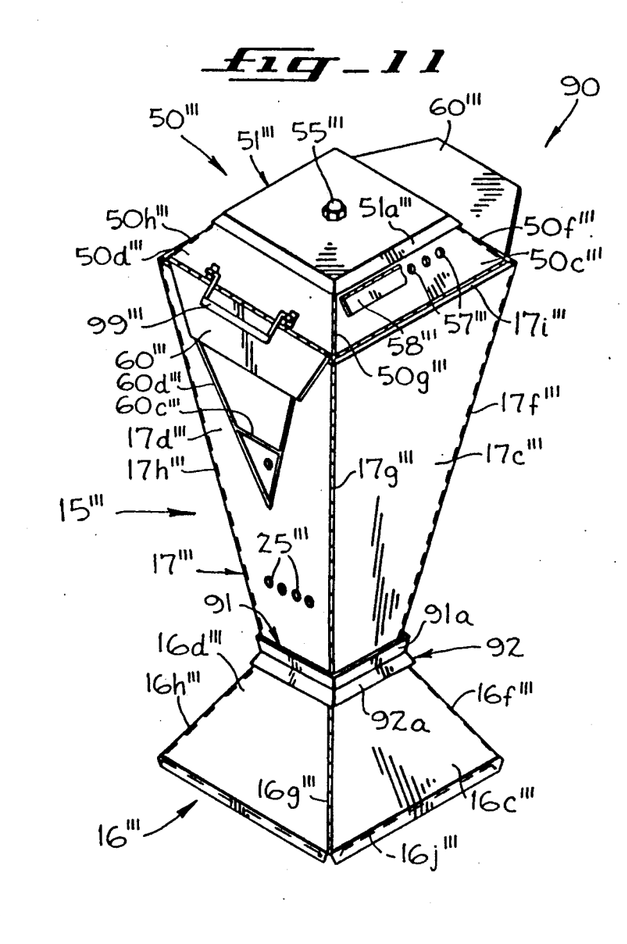
FIG. 11 is a rear perspective view of the outdoor cooking unit shown in FIG. 10.
Figures 12, 13:
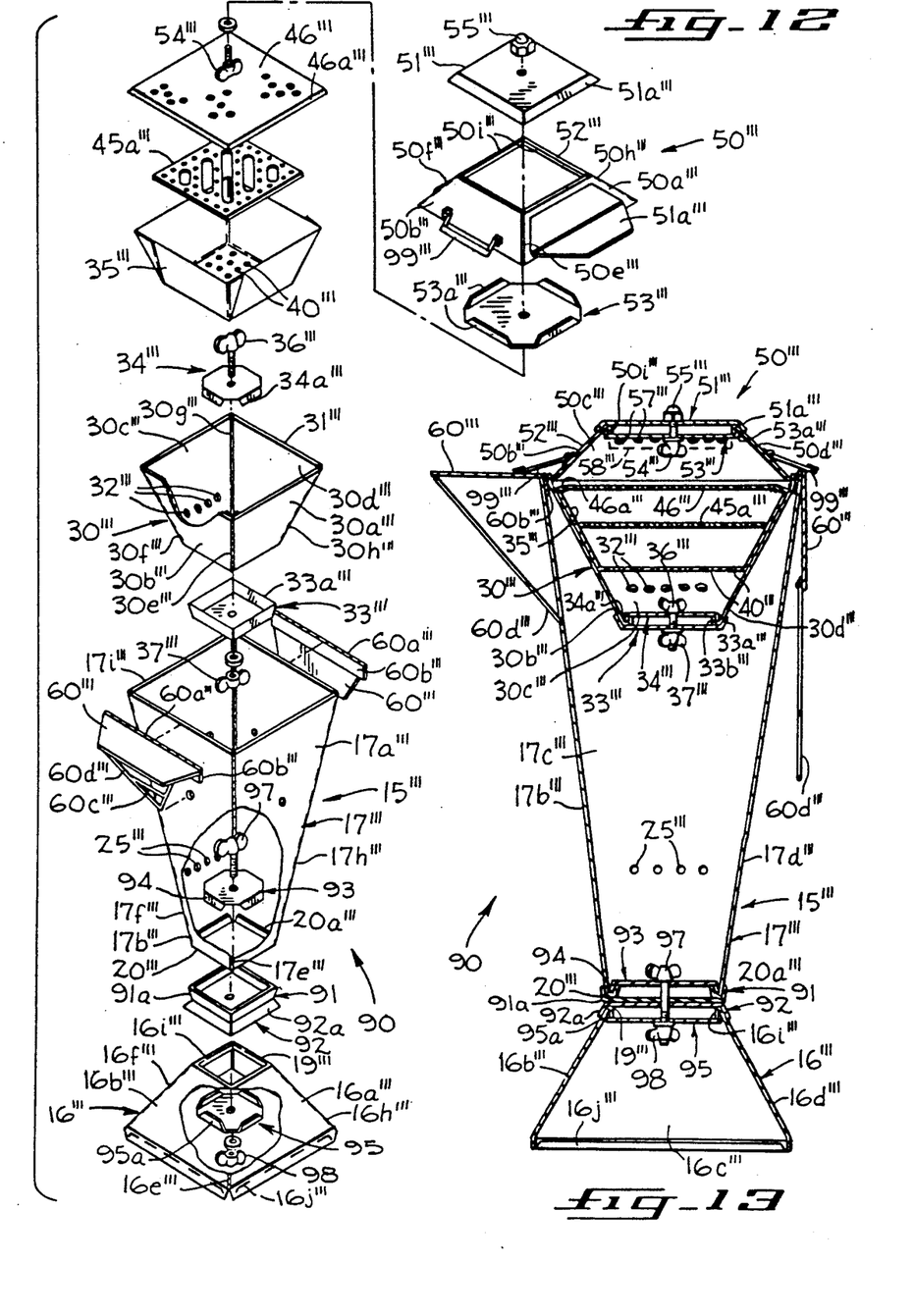
FIG. 12 is an exploded view of the outdoor cooking unit shown in FIGS. 10 and 11.
FIG. 13 is a vertical sectional view, partially in elevation, of the outdoor cooking unit shown in FIGS. 10-12 taken along a vertical centerline.
Figure 14:
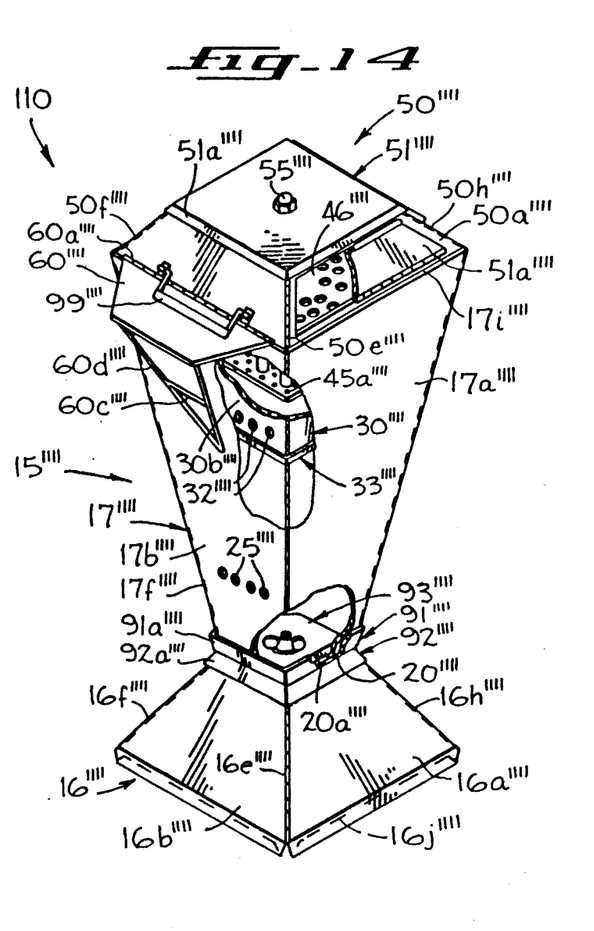
FIG. 14 is a front perspective view, partially broken away, of a further modified outdoor cooking unit embodying the present invention without a foil liner lining the firebox.
Figure 15:
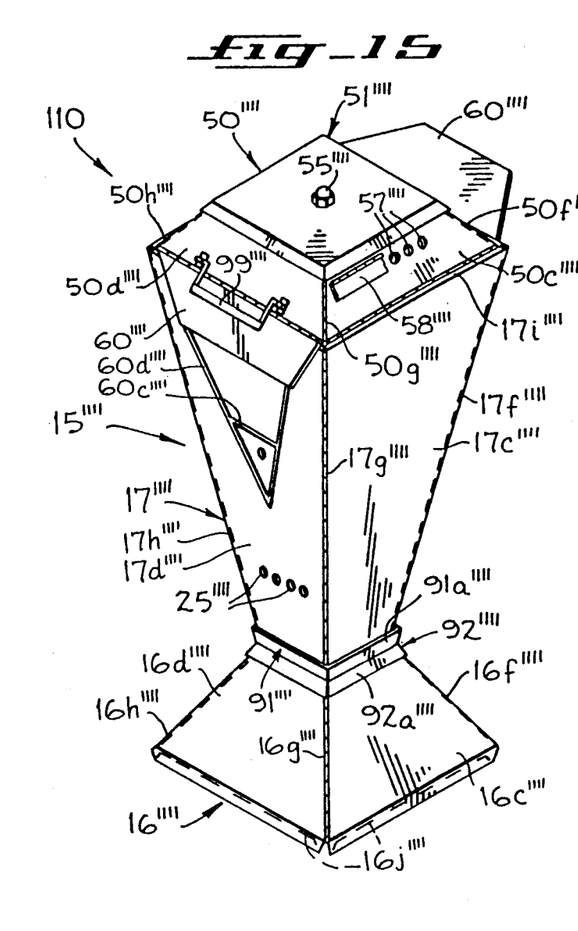
FIG. 15 is a rear perspective view of the outdoor cooking unit shown in FIG. 14.
Figures 16, 17:
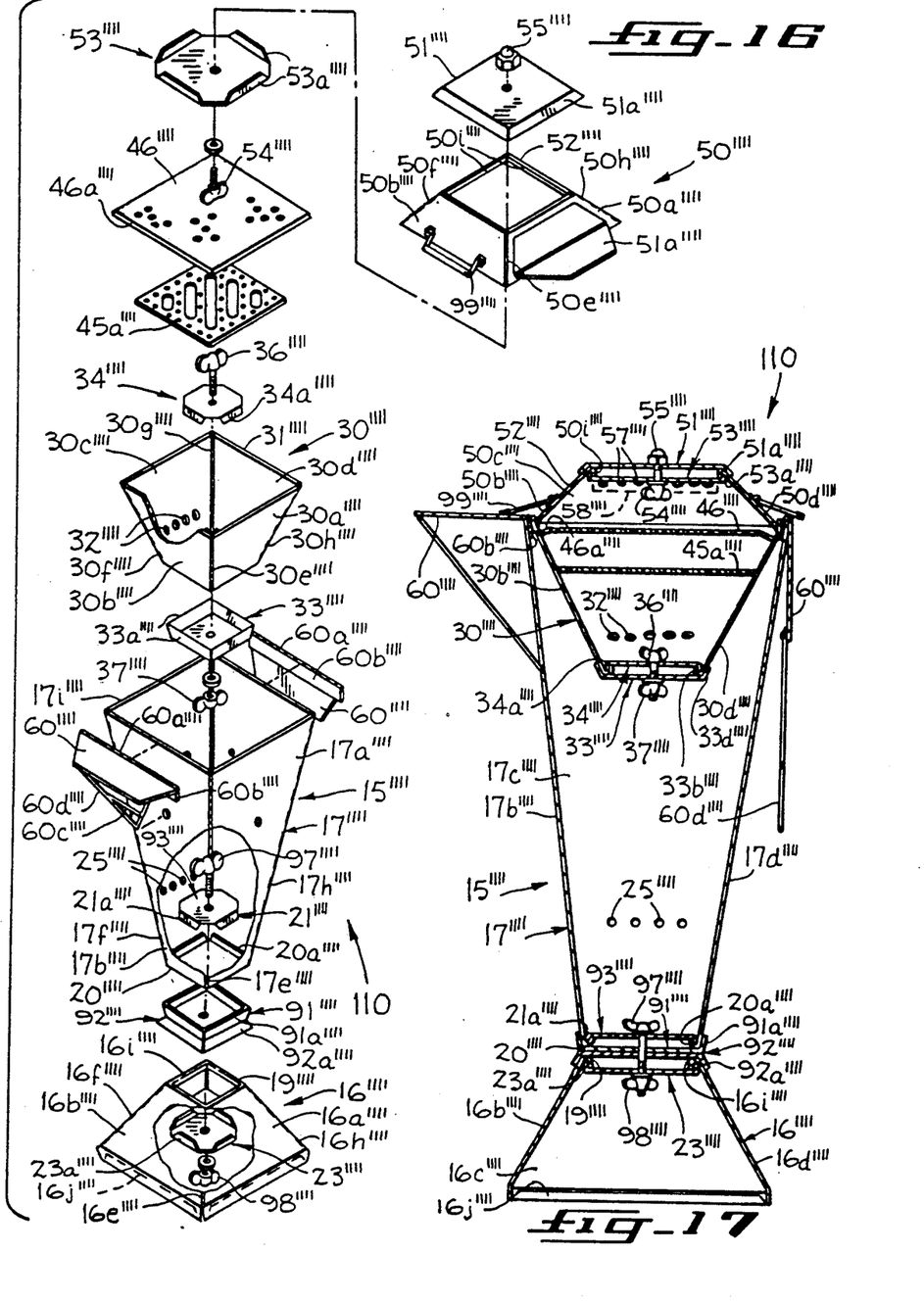
FIG. 16 is an exploded view of the outdoor cooking unit shown in FIGS. 14 and 15.
FIG. 17 is a vertical sectional view, partially in elevation, of the outdoor cooking unit shown in FIGS. 14-16 taken along a vertical centerline.

Illustrated in FIG. 9 is an outdoor cooking unit 80, which is a modification of the outdoor cooking unit 10 and the outdoor cooking unit 70. Components of the outdoor cooking 80 similar in structure and function to either the outdoor cooking unit 10 or the outdoor cooking unit 70 will have the same reference numeral but with a double prime suffix. The outdoor cooking unit 80 is similar to either the outdoor cooking unit 10 or the outdoor cooking unit 70, except the respective bases 16 and 16' have been omitted and the pillar 17a" is of reduced height. In lieu thereof, a support arm 81 extends generally in the horizontal direction from the bottom quadrilateral perimeter 20" of the pillar 17" to be clamped onto the rail of a boat, a fireplace or any similar suitable support.

Toward this end, a cover plate 82 with outwardly and upwardly extending flanges 82a is disposed at the quadrilateral perimeter 20" to engage or embrace the panels 17a"-17d" (only two panels are shown in FIG. 9) of the pillar 17". A clamp plate 83 with depending flanges 83a is disposed within the pillar 17". The clamp plate 83 is generally quadrilateral and seats through its flanges 83a within the channel flanges 20a" of the pillar 17" at the perimeter 20". A thumb bolt 84 enters the center opening of the cover plate 82 and the clamping plate 83. A wing nut 85 is threaded to the thumb bolt 84 to detachably secure the support arm 81 to the pillar 17".

Illustrated in FIGS. 10-13 is an outdoor cooking unit 90, which is a further modification of the outdoor cooking unit 10 shown in FIGS. 1-4. Components of the outdoor cooking unit 90 similar in structure and function to the components of the outdoor cooking unit 10 will have the same reference numeral but with a triple prime suffix.

The outdoor cooking unit 90 differs from the outdoor cooking unit 10 in that the arrangement for releasably securing the pillar 17''' to the base 16''' includes a base plate 91 and a cover plate 92. The base plate 91 and the cover plate 92 are fixedly secured together back-to-back. The cover plate 92 seats on the upper quadrilateral perimeter 19''' of the base 16'''. The cover plate 92 has a center opening and depending angular sides 92a that extend downwardly and outwardly to overlap the quadrilateral perimeter 19''' of the base 16'''.

The lower quadrilateral perimeter 20''' of the pillar 17''' seats on the base plate 91 within upwardly and outwardly projecting flanges 91a of the base plate 91. The base plate 91 embraces the lower quadrilateral perimeter 20''' of the pillar 17'''. The base plate 91 has a center opening aligned with the center of the cover plate 92. Seated within the channel flanges 20a''' of the pillar 17''' is an upper clamping plate 93 with a center opening aligned with the center openings of the base plate 91 and the cover plate 92. The upper clamping plate 93 has a generally quadrilateral perimeter. The quadrilateral perimeter of the upper clamping plate 93 has depending flanges 94 that seat respectively within the channel flanges of the piller 17'''.

The quadrilateral perimeter of a lower clamping plate 95 has generally upwardly directed flanges 96 that engage, respectively, downwardly turned flanges 16i''' of the base 16'''. The lower clamping plate 95 is formed with a center opening aligned with the center opening of the base plate 91, the cover plate 92 and the upper clamping plate 93. A thumb bolt 97 is received by the center openings of the base plate 91, the cover plate 92, the upper clamping plate 93 and the lower clamping plate 95. A wing nut 98 is threaded to the bolt 97 to detachably secure the pillar 17''' to the base 16'''.

In the exemplary embodiment of the outdoor cooking unit 90, the outdoor cooking unit 90 employs flat, bar-shaped handles 99 in lieu of coil spring 59.

Illustrated in FIGS. 14-17 is an outdoor cooking unit 110, which is a modification of the outdoor cooking unit 90. Components of the outdoor cooking unit 110 similar in structure and function to the outdoor cooking unit 90 will have the same reference numeral, but with a quadruple prime suffix.

The outdoor cooking unit 110 differs from the outdoor cooking unit 90 in that the foil liner 35''' is not used. Hence, the fire grates, such as the fire grate 45a'''', will seat within the firebox 30'''' and engage the interior walls of the firebox 30'''' to be supported thereby. In a similar manner, the cooking grill 46'''' will seat on the upper quadrilateral perimeter 17a'''' of the pillar 17'''' or seat within the firebox 30'''' above the fire grate 40'''' and engage the interior walls of the firebox 30'''' to be supported thereby. The manner of supporting the cooking grill 46'''' is dependent on its relative dimensions which is determined by the food to be cooked by the cooking unit 110. In all respects, other than the use of the foil liner 35'''', the cooking units 90 and 110 are similar.

What is claimed is:

1. An outdoor cooking unit comprising:
   (a) a hollow firebox;
   (b) a fire grate disposed in said firebox on which fire grate fuel is supported;
   (c) a cooking grill disposed above said fire grate on which cooking grill food is supported; and
   (d) a foldable pedestal stand elongated in the upright direction for supporting said firebox at a convenient height for an operator, said pedestal stand including a foldable upstanding elongated hollow member having an inverted, truncated pyramidal configuration and a quadrilateral lower perimeter.

2. An outdoor cooking unit as claimed in claim 1 wherein said pedestal stand includes a foldable base having a truncated pyramidal configuration and an upper quadrilateral perimeter, said hollow member being supported by said base at the quadrilateral lower perimeter of said hollow member and at the quadrilateral upper perimeter of said base, said pedestal stand comprising means for detachably securing said hollow member to said base.

3. An outdoor cooking unit as claimed in claim 2 wherein said hollow member comprises a plurality of hollow member panels, each of said hollow member panels having an inverted trapezoidal configuration and being joined to adjacent hollow member panels in side-by-side relation, and a plurality of hollow member hinges connected respectively to joining sides of said hollow member panels for folding and extending said hollow member.

4. An outdoor cooking unit as claimed in claim 3 wherein said base comprises a plurality of base panels, each of said base panels having a trapezoidal configuration and being joined to adjacent base panels in side-by-side relation, and a plurality of base hinges connected respectively to joining sides of said base panels for folding and extending said base.

5. An outdoor cooking unit as claimed in claim 4 wherein said firebox has an inverted, truncated pyramidal configuration and a quadrilateral upper perimeter, and wherein said firebox comprises a plurality of firebox panels, each of said firebox panels having an inverted trapezoidal configuration and being joined to adjacent firebox panels in side-by-side relation, and a plurality of firebox hinges connected respectively to joining sides of said firebox panels for folding and extending said firebox.

6. An outdoor cooking unit as claimed in claim 5 and comprising a foldable hollow hood disposed on said upper quadrilateral perimeter of said upstanding hollow member of said pedestal stand above said cooking grill to form a cooking chamber, said hollow hood having a truncated pyramidal configuration and a lower quadrilateral perimeter dimensioned and configured to be supported by said upstanding hollow member of said pedestal stand, said hollow hood comprising a plurality of hood panels, each of said hood panels having a trapezoidal configuration and being joined to adjacent hood panels in side-by-side relation, and a plurality of hood hinges connected respectively to joining sides of said hood panels for folding and extending said hood.

7. An outdoor cooking unit as claimed in claim 1 wherein said cooking grill is formed with angled flanges along the perimeter thereof to inhibit food from falling from said grill.

8. An outdoor cooking unit comprising:
   (a) a hollow firebox,
   (b) a fire grate disposed in said firebox on which fire grate fuel is supported;
   (c) a cooking grill disposed above said fire grate on which cooking grill food is supported; and
   (d) a foldable pedestal stand elongated in the upright direction for supporting said firebox at a convenient height for an operator, said pedestal stand including a foldable upstanding elongated hollow member having an inverted, truncated pyramidal configuration and a quadrilateral lower perimeter, said pedestal stand including a foldable base having a truncated pyramidal configuration and an upper quadrilateral perimeter, said hollow member being supported by said base at the quadrilateral lower perimeter of said hollow member and at the quadrilateral upper perimeter of said base, said pedestal stand comprising means for detachably securing said hollow member to said base,
   (e) said hollow member comprising a plurality of hollow member panels, each of said hollow member panels having an inverted trapezoidal configuration and being joined to adjacent hollow member panels in side-by-side relation, and a plurality of hollow member hinges connected respectively to joining sides of said hollow member panels for folding and extending said hollow member,
   (f) said base comprising a plurality of base panels, each of said base panels having a trapezoidal configuration and being joined to adjacent base panels in side-by-side relation, and a plurality of base hinges connected respectively to joining sides of said base panels for folding and extending said base,
   (g) said means for detachably securing said hollow member to said base comprising:
     (a) a cover plate having a quadrilateral configuration seated on said quadrilateral upper perimeter of said base and engaging the outer walls of said base panels, said cover plate having a center opening;
     (b) a first clamping plate having a quadrilateral configuration and disposed within said base to engage the inner walls of said base panels, said first clamping plate having a center opening;
     (c) second clamping plate having a quadrilateral configuration and disposed within said hollow member to engage the inner walls of said hollow member panels, said second clamping plate having a center opening; and
     (d) fastening means received by said center openings of said cover plate, said first clamping plate and said second clamping plate for detachably securing said hollow member to said base.

9. An outdoor cooking unit as claimed in claim 8 wherein said cover plate is formed with downwardly and outwardly extending walls along the quadrilateral perimeter thereof to engage the outer walls of said base panels at the quadrilateral upper perimeter thereof, wherein said hollow member panels are formed respectively with upstanding inner walls along the quadrilateral lower perimeter thereof for forming hollow member quadrilateral-shaped channels along the interior of said hollow member panels, wherein said base panels are formed, respectively, within downwardly directed inner walls along the quadrilateral upper perimeter thereof for forming base quadrilateral-shaped channels along the interior of said base, wherein said first clamping plate being formed with downwardly directed walls along the quadrilateral perimeter thereof to seat within said hollow member quadrilateral-shaped channels of said hollow member panels, and wherein said second clamping plate being formed with upwardly directed walls along the quadrilateral perimeter thereof to seat within said base quadrilateral-shaped channels.

10. An outdoor cooking unit as claimed in claim 8 wherein said means for detachably securing said hollow member to said base member includes a base plate having a quadrilateral configuration, said base plate being secured to said cover plate and engaging the outer walls of said hollow member panels, said base plate being formed with a center opening for receiving said fastening means.

11. An outdoor cooking unit as claimed in claim 9 wherein said base plate is formed with upwardly and outwardly extending walls along the quadrilateral perimeter thereof to engage the outer walls of said hollow member panels.

12. An outdoor cooking unit comprising:
(a) a hollow firebox,
(b) a fire grate disposed in said firebox on which fire grate fuel is supported;
(c) a cooking grill disposed above said fire grate on which cooking grill food is supported;
(d) a foldable pedestal stand elongated in the upright direction for supporting said firebox at a convenient height for an operator, said pedestal stand including a foldable upstanding elongated hollow member having an inverted, truncated pyramidal configuration and a quadrilateral lower perimeter, said pedestal stand including a foldable base having a truncated pyramidal configuration and an upper quadrilateral perimeter, said hollow member being supported by said base at the quadrilateral lower perimeter of said hollow member and at the quadrilateral upper perimeter of said base, said pedestal stand comprising means for detachably securing said hollow member to said base, and
(e) said hollow member comprising a plurality of hollow member panels, each of said hollow member panels having an inverted trapezoidal configuration and being joined to adjacent hollow member panels in side-by-side relation, and a plurality of hollow member hinges connected respectively to joining sides of said hollow member panels for folding and extending said hollow member,
(f) said base comprising a plurality of base panels, each of said base panels having a trapezoidal configuration and being joined to adjacent base panels in side-by-side relation, and a plurality of base hinges connected respectively to joining sides of said base panels for folding said extending said base,
(g) said firebox having an inverted, truncated pyramidal configuration and a quadrilateral upper perimeter, said firebox comprising a plurality of firebox panels, each of said firebox panels having an inverted trapezoidal configuration and being joined to adjacent firebox panels in side-by-side relation, and a plurality of firebox hinges connected respectively to joining sides of said firebox panels for folding and extending said firebox,
(h) rigidifying means for said firebox, said firebox rigidifying means comprising:
(a) a firebox cover plate having a quadrilateral configuration and engaging the outer walls of said firebox panels at the quadrilateral lower perimeter thereof, said firebox cover plate having a center opening;
(b) a firebox clamping plate having a quadrilateral configuration and disposed within said firebox to engage the inner walls of said firebox panels, said firebox clamping plate having a center opening; and
(c) fastening means received by said center openings of said firebox cover plate and said firebox clamping plate for rigidifying said firebox while in the extended state.

13. An outdoor cooking unit as claimed in claim 12 wherein said firebox cover plate is formed with upwardly and outwardly extending walls along the quadrilateral perimeter thereof to engage the outer walls of said firebox panels, said firebox panels at the quadrilateral lower perimeter thereof seats within said firebox cover plate at the upwardly and outwardly extending walls of said firebox cover plate, wherein said firebox panels are formed respectively with upstanding inner walls along the quadrilateral lower perimeter thereof for forming firebox quadrilateral-shaped channels along the interior of said firebox panels, and wherein said firebox clamping plate is formed with downwardly directed walls along the quadrilateral perimeter thereof to seat within said firebox quadrilateral-shaped channels of said firebox panels.

14. An outdoor cooking unit comprising:
(a) a hollow firebox,
(b) a fire grate disposed in said firebox on which fire grate fuel is supported;
(c) a cooking grill disposed above said fire grate on which cooking grill food is supported;
(d) a foldable pedestal stand elongated in the upright direction for supporting said firebox at a convenient height for an operator, said pedestal stand including a foldable upstanding elongated hollow member having an inverted, truncated pyramidal configuration and a quadrilateral lower perimeter, said pedestal stand including a foldable base having a truncated pyramidal configuration and an upper quadrilateral perimeter, said hollow member being supported by said base at the quadrilateral lower perimeter of said hollow member and at the quadrilateral upper perimeter of said base, said pedestal stand comprising means for detachably securing said hollow member to said base,
(e) said hollow member comprising a plurality of hollow member panels, each of said hollow member panels having an inverted trapezoidal configuration and being joined to adjacent hollow member panels in side-by-side relation, and a plurality of hollow member hinges connected respectively to joining sides of said hollow member panels for folding and extending said hollow member, (f) said base comprising a plurality of base panels, each of said base panels having a trapezoidal configuration and being joined to adjacent base panels in side-by-side relation, and a plurality of base hinges connected respectively to joining sides of said base panels for folding said extending said base, (g) said firebox having an inverted, truncated pyramidal configuration and a quadrilateral upper perimeter, said firebox comprising a plurality of firebox panels, each of said firebox panels having an inverted trapezoidal configuration and being joined to adjacent firebox panels in side-by-side relation, and a plurality of firebox hinges connected respectively to joining sides of said firebox panels for folding and extending said firebox, (h) a foldable hollow hood disposed on said upper quadrilateral perimeter of said upstanding hollow member of said pedestal stand above said cooking grill to form a cooking chamber, said hollow hood having a truncated pyramidal configuration and a lower quadrilateral perimeter dimensioned and configured to be supported by said upstanding hollow member of said pedestal stand, said hollow hood comprising a plurality of hood panels, each of said hood panels having a trapezoidal configuration and being joined to adjacent hood panels in side-by-side relation, and a plurality of hood hinges connected respectively to joining sides of said hood panels for folding and extending said hood, and (i) rigidifying means for said hood, said hood rigidifying means comprising:
   (a) a hood cover plate having a quadrilateral configuration and engaging the outer walls of said hood panels at the quadrilateral upper perimeter thereof, said hood cover plate having a center opening;
   (b) a hood clamping plate having a quadrilateral configuration and disposed within said hood to engage the inner walls of said hood, said hood clamping plate having a center opening; and
   (c) fastening means received by said center openings of said hood cover plate and said hood clamping plate for rigidifying said hood during the extended state.

15. An outdoor cooking unit as claimed in claim 14 wherein said hood cover plate is formed with downwardly and outwardly extending walls along the quadrilateral perimeter thereof to engage the outer walls of said hood panels, said hood panels being formed respectively with depending inner walls along the quadrilateral upper perimeter thereof for forming hood quadrilateral-shaped grooves along the interior of said hood panels, and wherein said hood clamping plate being formed with upstanding directed walls along the quadrilateral perimeter thereof to be received by said hood quadrilateral grooves of said hood panels.

16. An outdoor cooking unit comprising:
(a) a hollow firebox;
(b) a fire grate disposed in said firebox on which fire grate fuel is supported;
(c) a cooking grill disposed above said fire grate on which cooling grill food is supported;
(d) said firebox having an inverted, truncated pyramidal configuration and a quadrilateral upper perimeter, said firebox comprising a plurality of firebox panels, each of said firebox panels having an inverted trapezoidal configuration and being joined to adjacent firebox panels in side-by-side relation;
(e) a plurality of firebox hinges connected respectively to joining sides of said firebox panels for folding and extending said firebox; and
(g) rigidifying means for rigidifying said firebox in an extended state, said rigidifying means comprising:
   (a) a cover plate having a quadrilateral configuration and engaging the outer walls of said firebox panels at the quadrilateral lower perimeter thereof, said cover plate having a center opening;
   (b) a clamping plate having a quadrilateral configuration and disposed within said firebox to engage the inner walls of said firebox panels, said clamping plate having a center opening; and
   (c) fastening means received by said center openings of said cover plate and said clamping plate for rigidifying said firebox while in the extended state.

17. An outdoor cooking unit as claimed in claim 16 wherein said cover plate is formed with upwardly and outwardly extending walls along the quadrilateral perimeter thereof to engage the outer walls of said firebox panels, said firebox panels at the quadrilateral lower perimeter thereof seats within said cover plate at the upwardly and outwardly extending walls of said cover plate, wherein said firebox panels are formed respectively with upstanding inner walls along the quadrilateral lower perimeter thereof for forming quadrilateral-shaped channels along the interior of said firebox panels, and wherein said clamping plate is formed with downwardly directed walls along the quadrilateral perimeter thereof to seat within said quadrilateral-shaped channels of said firebox panels.

18. An outdoor cooking unit comprising:
(a) a hollow firebox;
(b) a fire grate disposed in said said firebox on which fire grate fuel is supported;
(c) a cooking grill disposed above said fire grate on which cooling grill food is supported;
(d) a hollow hood for forming a cooling chamber, said hollow hood having a truncated pyramidal configuration and a lower quadrilateral perimeter, said hollow hood comprising a plurality of hood panels, each of said hood panels having a trapezoidal configuration and being joined to adjacent hood panels in side-by-side relation;
(e) a plurality of hood hinges connected respectively to joining sides of said hood panels for folding and extending said hood; and
(f) rigidifying means for said hood for retaining said hood in an extended state, said rigidifying means comprising:
   (a) a cover plate having a quadrilateral configuration and engaging the outer walls of said hood panels at the quadrilateral upper perimeter thereof, said cover plate having a center opening;
   (b) a clamping plate having a quadrilateral configuration and disposed within said hood to engage the inner walls of said hood, said clamping plate having a center opening; and (c) fastening means received by said center openings of said cover plate and said clamping plate for rigidifying said hood during the extended state.

19. An outdoor cooking unit as claimed in claim 18 wherein said cover plate is formed with downwardly and outwardly extending walls along the quadrilateral perimeter thereof to engage the outer walls of said hood panels, said hood panels being formed respectively with depending inner walls along the quadrilateral upper perimeter thereof for forming quadrilateral-shaped grooves along the interior of said hood panels, and wherein said clamping plate being formed with upstanding directed walls along the quadrilateral perimeter thereof to be received by said quadrilateral grooves of said hood panels.

20. An outdoor cooling unit comprising:
(a) a hollow firebox;
(b) a fire grate disposed in said firebox on which fire grate fuel is supported;
(c) a cooking grill disposed above said fire grate on which said cooling grill is supported;
(d) a foldable upstanding elongated hollow member supporting said firebox and having an inverted, truncated pyramidal configuration and a quadrilateral lower perimeter; and
(e) a support arm detachably secured to said foldable upstanding elongated hollow member at the quadrilateral lower perimeter thereof and extending in a generally horizontal direction for supporting said outdoor cooking unit form a suitable support structure.

21. An outdoor cooking unit as claimed in claim 20 wherein said foldable upstanding elongated hollow member comprises a plurality of hollow member panels, each of said hollow member panels having an inverted trapezoidal configuration and being joined to adjacent hollow panels in side-by-side relation, and a plurality of hollow member panel hinges connected respectively to join sides of said hollow member panels for folding and extending said foldable upstanding elongated hollow member.

22. An outdoor cooking unit comprising:
(a) a hollow firebox;
(b) a fire grate disposed in said firebox on which fire grate fuel is supported;
(c) a cooking grill disposed above said fire grate on which said cooking grill is supported;
(d) a foldable upstanding elongated hollow member having an inverted, truncated pyramidal configuration and a quadrilateral lower perimeter; and
(e) a support arm detachably secured to said foldable upstanding elongated hollow member at the quadrilateral lower perimeter thereof and extending in a generally horizontal direction for supporting said outdoor cooking unit from a suitable support structure,
(f) said foldable upstanding elongated hollow member comprising a plurality of hollow member panels, each of said hollow member panels having an inverted trapezoidal configuration and being joined to adjacent hollow panels in side-by-side relation, and a plurality of hollow member panel hinges connected respectively to joining sides of said hollow member panels for folding and extending said foldable upstanding elongated hollow member; and
(g) means for detachably securing said support arm to said foldable upstanding elongated hollow member at the quadrilateral lower perimeter thereof, said means comprising:
  (a) a cover plate having a quadrilateral configuration engaging the outer walls of said hollow member panels at said quadrilateral lower perimeter of said foldable upstanding elongated hollow member, said cover plate having a center opening;
  (b) a clamping plate having a quadrilateral configuration and disposed within said foldable upstanding elongated hollow member to engage the inner walls of said hollow member panels, said clamping means having a center opening;
  (c) said support arm being formed with an opening at said quadrilateral lower perimeter of said foldable upstanding elongated hollow member; and
  (d) fastening means received by said center opening of said cover plate, said clamping plate and said support arm for detachably securing said foldable upstanding elongated hollow member to said support arm.

23. An outdoor cooking unit comprising:
(a) a foldable hollow firebox;
(b) a fire grate disposed in said firebox on which fire grate fuel is supported;
(c) a cooking grill disposed above said fire grate on which cooling grill food is supported; and
(d) a foldable pedestal stand elongated in the upright direction for supporting said firebox above the ground at a convenient height for an operator, said pedestal stand including an upstanding elongated hollow member having an inverted, truncated pyramidal configuration and a quadrilateral upper perimeter,
(e) said firebox having an inverted truncated pyramidal configuration and a quadrilateral upper perimeter, said firebox being disposed generally entirely within said upstanding hollow member of said pedestal stand, said firebox being configured and dimensioned for the upper perimeter of said firebox to be supported by said upstanding member of said pedestal stand at said quadrilateral upper perimeter of said upstanding hollow member.

* * * * *